United States Patent
Gupta (10) Patent No.: US 11,125,210 B2
(45) Date of Patent: Sep. 21, 2021

(54) ANALYSIS OF WIND TURBINE NOISE (71) Applicant: VESTAS WIND SYSTEMS A/S, Aarhus N (DK)

(72) Inventor: Mranal Gupta, Tilst (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 362 days.

(21) Appl. No.: 16/301,406

(22) PCT Filed: May 17, 2017

(86) PCT No.: PCT/DK2017/050158
§ 371 (c)(1),
(2) Date: Nov. 13, 2018

(87) PCT Pub. No.: WO2017/198270
PCT Pub. Date: Nov. 23, 2017

(65) Prior Publication Data
US 2020/0318611 A1    Oct. 8, 2020

(30) Foreign Application Priority Data
May 18, 2016 (DK) .............................. PA201670327

(51) Int. Cl.
F03D 7/02      (2006.01)
F03D 17/00    (2016.01)
F03D 7/04      (2006.01)

(52) U.S. Cl.
CPC ......... *F03D 7/0296* (2013.01); *F03D 7/0224* (2013.01); *F03D 7/042* (2013.01);
(Continued)

(58) Field of Classification Search
CPC ........ F03D 7/0224; F03D 7/042; F03D 17/00; F03D 7/0296; F05B 2260/80;
(Continued)

(56) References Cited

U.S. PATENT DOCUMENTS

2007/0031237 A1    2/2007 Bonnet
2007/0189550 A1    8/2007 Wu
(Continued)

FOREIGN PATENT DOCUMENTS

CN    103797244 A    5/2014
WO    2017198270 A1    11/2017

OTHER PUBLICATIONS

Chinese Office Action for Application No. 201780044303.5 dated Dec. 3, 2019.
(Continued)

*Primary Examiner* — Igor Kershteyn
(74) *Attorney, Agent, or Firm* — Patterson + Sheridan, LLP (57) ABSTRACT

A method of analyzing wind turbine noise is provided. The method comprises acquiring noise data representing noise produced by a wind turbine and acquiring data from a plurality of vibration sensors positioned at different locations about the wind turbine. The method further comprises identifying a region of interest in the noise data, the region of interest being a candidate for containing tonal noise generated by the wind turbine, and identifying a vibration sensor, the data for which correlates with the noise data in the region of interest. The method further comprises determining a threshold vibration level for the identified vibration sensor, the threshold being based on the vibration level detected by the identified vibration sensor in the region of interest, and determining when the vibration level detected by the identified vibration sensor exceeds the determined threshold.

33 Claims, 8 Drawing Sheets (52) U.S. Cl.
CPC .......... *F03D 17/00* (2016.05); *F05B 2260/96* (2013.01); *F05B 2270/32* (2013.01); *F05B 2270/328* (2013.01); *F05B 2270/333* (2013.01); *F05B 2270/334* (2013.01); *F05B 2270/81* (2013.01)

(58) Field of Classification Search
CPC ............ F05B 2260/96; F05B 2270/333; F05B 2270/334; F05B 2270/32; F05B 2270/81; F05B 2270/328; Y02E 10/72
See application file for complete search history.

(56) References Cited

U.S. PATENT DOCUMENTS

| | | |
|---|---|---|
| 2007/0201704 A1 | 8/2007 | Ishii et al. |
| 2008/0164091 A1* | 7/2008 | Kerber .................... F03D 17/00 181/211 |
| 2009/0169378 A1 | 7/2009 | Menke |
| 2010/0143119 A1* | 6/2010 | Kooijman ............. F03D 7/0224 416/1 |
| 2011/0135442 A1* | 6/2011 | Kerber .................... F03D 17/00 415/1 |
| 2014/0193257 A1 | 7/2014 | Ormel et al. |

OTHER PUBLICATIONS

PCT Written Opinion of the International Searching Authority for Application No. PCT/DK2017/050158 dated Aug. 24, 2017.
PCT International Search Report for Application No. PCT/DK2017/0650158 dated Aug. 24, 2017.
Danish Patent and Trademark Office First Techincal Examination for Application No. PA 2016 70327 dated Dec. 19, 2016.
Chinese Office Action for Application No. 201780044303.5 dated Mar. 15, 2021.

* cited by examiner

ANALYSIS OF WIND TURBINE NOISE

TECHNICAL FIELD

The present invention relates to the analysis and control of noise emission from wind turbines, and particularly to tonal noise emission.

BACKGROUND

Noise emission from wind turbines is a well-known problem and has been the subject of extensive work. The procedure for measuring wind turbine acoustic noise is described in the third edition of international standard IEC 61400-11.

The noise emission from a wind turbine includes both mechanical noise, also known as structure borne noise (SBN), and aerodynamic noise. Mechanical noise includes noise produced by components within the nacelle, such as the wind turbine gearbox. Aerodynamic noise comes from the wind turbine blades and includes, for example, noise due to vortex-shedding. It is also possible for the turbine blades to radiate mechanical noise to the surroundings.

The spectrum of noise produced by a wind turbine includes both broadband noise and noise at distinct frequencies. Noise at distinct frequencies, known as tonal noise, is often perceived as more annoying to wind turbine neighbours and is more likely to be the subject of noise complaints. Unfortunately, it is difficult to predict when a wind turbine will produce tonal noise and when tonal noise will be audible to wind turbine neighbours as this can depend on a wide variety of factors. This in turn makes it difficult to evaluate and act on noise complaints made by neighbours, and to adjust the operation of wind turbines to avoid or reduce the production of tonal noise.

European Patent Number 2337952 describes systems and methods for controlling the noise emission of wind turbines in wind parks. These methods include measuring wind speed and direction and using these to produce a wind turbine noise emission model for predicting noise as a function of the geographical position of the turbines, the geographical position of a noise immision point and operating parameters of the wind turbines. The operation of wind turbines in the wind park is controlled to prevent the predicted noise from exceeding a predetermined threshold. As explained above, tonal noise is difficult to predict.

Noise emission models such as those described in EP 2337952 are less effective for predicting tonal noise and identifying tonal noise events.

An object of the present invention is therefore to provide a method of analyzing noise emission from wind turbines that is effective for tonal noise, and a method of controlling the operation of wind turbines to reduce or avoid the production of tonal noise.

SUMMARY OF THE INVENTION

The invention is defined in the independent claims to which reference is now directed. Preferred features are detailed in the dependent claims.

According to a first aspect of the present invention, there is provided a method of analyzing wind turbine noise. The method comprises acquiring noise data representing noise produced by a wind turbine and acquiring data from a plurality of vibration sensors positioned at different locations about the wind turbine. The method further comprises identifying a region of interest in the noise data, the region of interest being a candidate for containing tonal noise generated by the wind turbine, and identifying a vibration sensor, from the plurality of vibration sensors, the data for which correlates with the noise data in the region of interest. Data obtained from the identified vibration sensor may be used to predict tonal noise emitted by a wind turbine, and may, for example, be used by a turbine controller or wind park controller in a control strategy to reduce tonal noise emissions or to log turbine operating data when tonal events occur.

Optionally the method further comprises determining, for the identified vibration sensor, a relationship between vibration data of the identified vibration sensor and the noise data. The relationship allows vibration data to be used as data indicative of tonal noise. The determination of the relationship may include determining a predetermined criteria fulfilled by the sensor data that indicates when tonal noise is occurring beyond a particular level. The determination of the relationship may include determining a threshold vibration level for the identified vibration sensor, the threshold being based on the vibration level detected by the identified vibration sensor in the region of interest, and determining when the vibration level detected by the identified vibration sensor exceeds the determined threshold.

The identifying of a vibration sensor may include identifying one or more vibration sensors, the data for each of which correlates with the noise data in the region of interest. The method may then further comprise determining a threshold vibration level for each of the identified vibration sensors, the threshold being based on the vibration level detected by the respective identified vibration sensor in the region of interest, and determining when the vibration level detected by each identified vibration sensor exceeds the respective determined threshold.

Although vibrations in the wind turbine give rise to noise, vibration level data does not generally correlate well with noise data representing audible noise away from the turbine, and therefore is not a direct indicator of noise. This is partly because the relationship between vibration and audible noise is very complex. As well as multiple primary sources of vibration, there are secondary sources of vibration that are being driven by primary sources, and tertiary sources being driven by secondary sources and so on. Non-primary sources can, in some cases, be more significant, especially if the driving frequency corresponds to a resonant frequency of the source that is being driven. Additionally, the extent to which vibrations from different sources and different frequencies will be radiated to the surroundings as noise varies significantly, as can the direction of propagation. Further still, how the sound is radiated can vary significantly depending on operating parameters of the wind turbine such as the RPM, wind speed and wind direction.

However, vibration levels may correlate well with audible noise levels in relatively narrow regions of the noise data, especially where the noise includes distinct frequencies that stand out from the broadband noise. Therefore, by identifying a region of interest in the noise data that may correspond to tonal noise, and correlating noise and vibration specifically in this region of interest, it is possible to use vibration level in a particular vibration sensor channel as a predictor for tonal noise. By determining a predetermined vibration condition, such as a threshold vibration level for the vibration sensor channel, where there is a correlation, subsequent possible tonal noise production can be identified from vibration data.

In some embodiments the method may further comprise acquiring wind turbine operating parameter data representing operating parameters of the wind turbine, such as RPM, power output, torque, wind speed and wind direction. The wind turbine operating parameter data may be used to determine a set of wind turbine operating parameters corresponding to the region of interest.

Where wind turbine operating parameter data has been acquired, the method may further comprise determining ranges for a set of wind turbine parameters based on wind turbine operating parameters in the region of interest. It may then be determined when the vibration level detected by the identified vibration sensor meets the predetermined criteria, such as exceeding a determined threshold vibration level, and the wind turbine operating parameters are within determined ranges.

Tonal noise production and audibility is found to vary significantly depending on operating parameters of a wind turbine. Therefore, even though vibration levels for an identified sensor may correlate with noise in a region of interest, vibration levels detected by the identified sensor may not alone be a reliable predictor of tonal noise production and/or audibility. By determining a set of wind turbine operating parameters for which the vibration level and noise level correlates, a more accurate prediction of tonal noise production and audibility can be made.

The region of interest may be identified by determining a variation of detected noise levels in the noise data indicative of tonal noise. In some embodiments, the region of interest is identified by comparing a maximum noise level and a minimum noise level present in the noise data associated with one or more wind turbine parameters. The one or more wind turbine parameters may be the RPM of the wind turbine. In this case, the region of interest may be an RPM range.

The method may further comprise time-synchronizing acquired noise data with acquired vibration data and/or wind turbine operating parameter data, where it has been acquired.

The method may further comprise determining a relationship between noise level, vibration level for the identified vibration sensor and, where wind turbine operating parameter data is available, one or more wind turbine operating parameters. The determined relationship may be used to estimate a noise level based on a vibration level for the identified vibration sensor, or to predict a set of wind turbine operating parameters for which tonal noise is likely to be generated by the wind turbine.

The method may further comprise logging an event when the vibration level detected by the identified vibration sensor meets a predetermined criteria, e.g. a criteria indicative of tonal noise being emitted. The predetermined criteria may be the exceeding of the determined threshold. Alternatively, an event may only be logged when the vibration level detected by the identified vibration sensor meet the predetermined condition and the wind turbine operating parameters are within a determined set of ranges. An event may also be logged in response to receiving a remote request. Such a remote request may be made by or in response to a wind turbine neighbour experiencing wind turbine noise.

Logging an event may involve logging one or more of the time of the event, the duration of the event, the vibration level detected by the vibration sensor at the time of the event, and one or more wind turbine operating parameters at the time of the event. A logged event can be compared to additional data indicative of noise levels generated by the wind turbine obtained from alternative sources.

Logging events is advantageous as an event log can be used to evaluate noise complaints, for example. Evaluating noise complaints associated with tonal noise has been a problem, partly because the production and audibility of tonal noise is so unpredictable. However, by logging events, if a wind turbine neighbour submits a complaint about wind turbine noise at a particular time, it can be determined whether this time coincides with a logged event. Where it does coincide with a logged event, one or more wind turbine operating parameters at the time of the event are known and can be used to determine future wind turbine operation. If the time of the noise complaint does not coincide with a logged event, this can be used to determine whether threshold vibration levels need to be adjusted.

The locations of the vibration sensors, which may be accelerometers or strain gauges, may be one or more of a gearbox, a generator, a main bearing housing, a main frame, a tower top or turbine blade root of the wind turbine. Vibration sensors may advantageously be located in the vicinity of components of the wind turbine that may be expected to generate or conduct vibration.

The vibration sensors may be sensors that are associated with a Condition Monitoring System (CMS) associated with the turbine. Using pre-existing CMS vibration sensors reduces the need to install new vibration sensors to implement the present invention.

In some embodiments the method further comprises identifying one or more second sensors, the data for which correlate with the noise data outside of the region of interest; determining a threshold vibration level for each of the one or more second vibration sensors, the threshold being based on the vibration level detected by the respective second vibration sensor; and determining when the vibration level detected by each of the second vibration sensors exceeds the threshold vibration level for that second vibration sensor. In such embodiments, a relationship between noise level, the vibration level detected by the respective second vibration sensor and, where wind turbine operating parameter data has been acquired, one or more wind turbine operating parameters may be determined.

Although noise data is not expected to generally correlate well with vibration data, what correlation there is can be used to determine a coarse threshold above which noise levels are likely to be unacceptable. This is useful, particularly in combination with more specific thresholds used to predict tonal noise production.

A controller for controlling a wind turbine or a wind power plant is also provided, the controller being configured to carry out the method of analyzing wind turbine noise. The controller may be configured to send a notification to a remote user when the vibration level detected by the identified vibration sensor exceeds the determined threshold. The notification can comprise logged wind turbine operating parameters.

A wind turbine comprising such a controller and a wind power plant comprising such a controller are also provided.

A computer program which, when executed on a computing device, cause it to carry out the method of analyzing wind turbine noise is also provided.

BRIEF DESCRIPTION OF THE DRAWINGS

Examples of the invention will now be described in more detail with reference to the accompanying drawing in which.

DETAILED DESCRIPTION OF PREFERRED EMBODIMENTS

Figure 1:
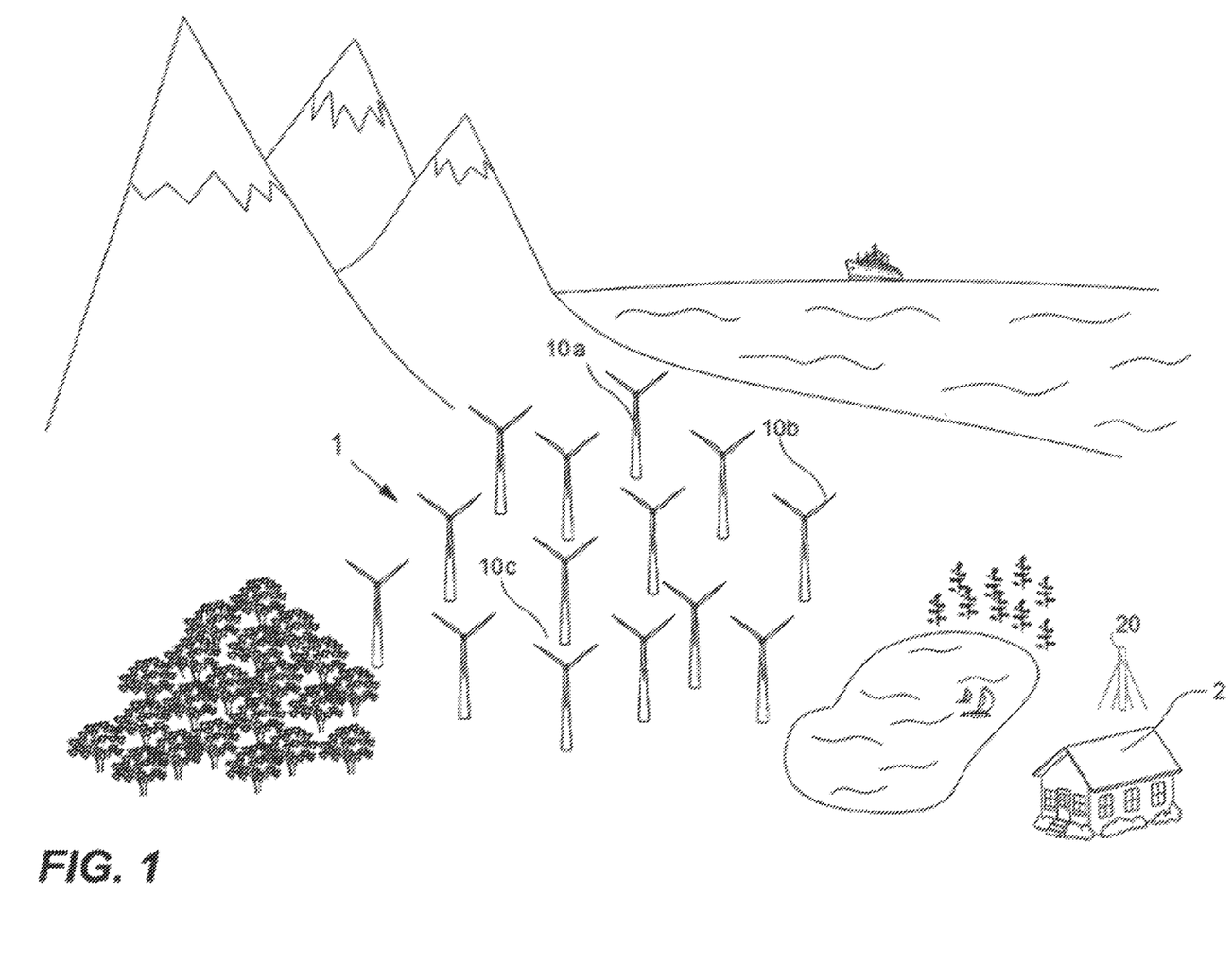
FIG. 1 is a perspective view of a landscape with a wind power plant.

FIG. 1 illustrates a wind power plant (1) including a number of wind turbines (10a, 10b, 10c) and a neighbouring area (2) in which wind turbine noise is audible. For the purposes of implementing the present invention, the wind power plant (1) can have any number of wind turbines greater than or equal to one, and the wind turbines can be wind turbine models known in the art.

In the vicinity of the neighbouring area (2), or on or nearby a respective wind turbine, there is a microphone (20) configured to capture noise data, including data representative of the noise produced by one or more of the wind turbines (10a, 10b, 10c) of the wind power plant. The microphone captures noise data over a broad frequency spectrum and an extended time period with a suitable sampling rate, for example in accordance with the procedure described in the third edition of IEC 61400-11.

The noise data captured by the microphone (20) is communicated from the microphone for analysis. For example, it may be communicated to one or more computers (not shown) that analyze data for, and/or control the operation of, one or more of the wind turbines (10a, 10b, 10c) of the wind power plant. Such computers may be internal or external to the wind power plant, and may be associated with one or more than one of the wind turbines of the wind power plant. That is, each wind turbine may be associated with one or more dedicated computers, or a plurality of wind turbines may share the one or more computers.

While FIG. 1 only shows one microphone (20), there may be additional microphones at other positions. There may, for example, be one or more microphones for each wind turbine. The noise data for the additional microphones can also be communicated for analysis. Separate channels of noise data may be treated independently or may be aggregated to produce a single noise dataset. It will also be appreciated that while FIG. 1 shows the neighbouring area (2) to be a populated area, this is not essential. The microphone(s) may simply be at a known location, a known distance from the wind turbine(s).

Operating parameters of the one or more wind turbines (10a, 10b, 10c) may also be measured by appropriate sensors and recorded over time, as is known in the art. For example, the RPM, power output, torque and/or blade pitch angle of a wind turbine may be recorded over time. The wind speed and/or wind direction at a wind turbine may also be recorded over time. Wind turbine operating parameter data representative of any of these parameters may be communicated for analysis. For example, the wind turbine operating parameter data may be communicated to the computer(s) to which the noise data is communicated.

Figure 2:
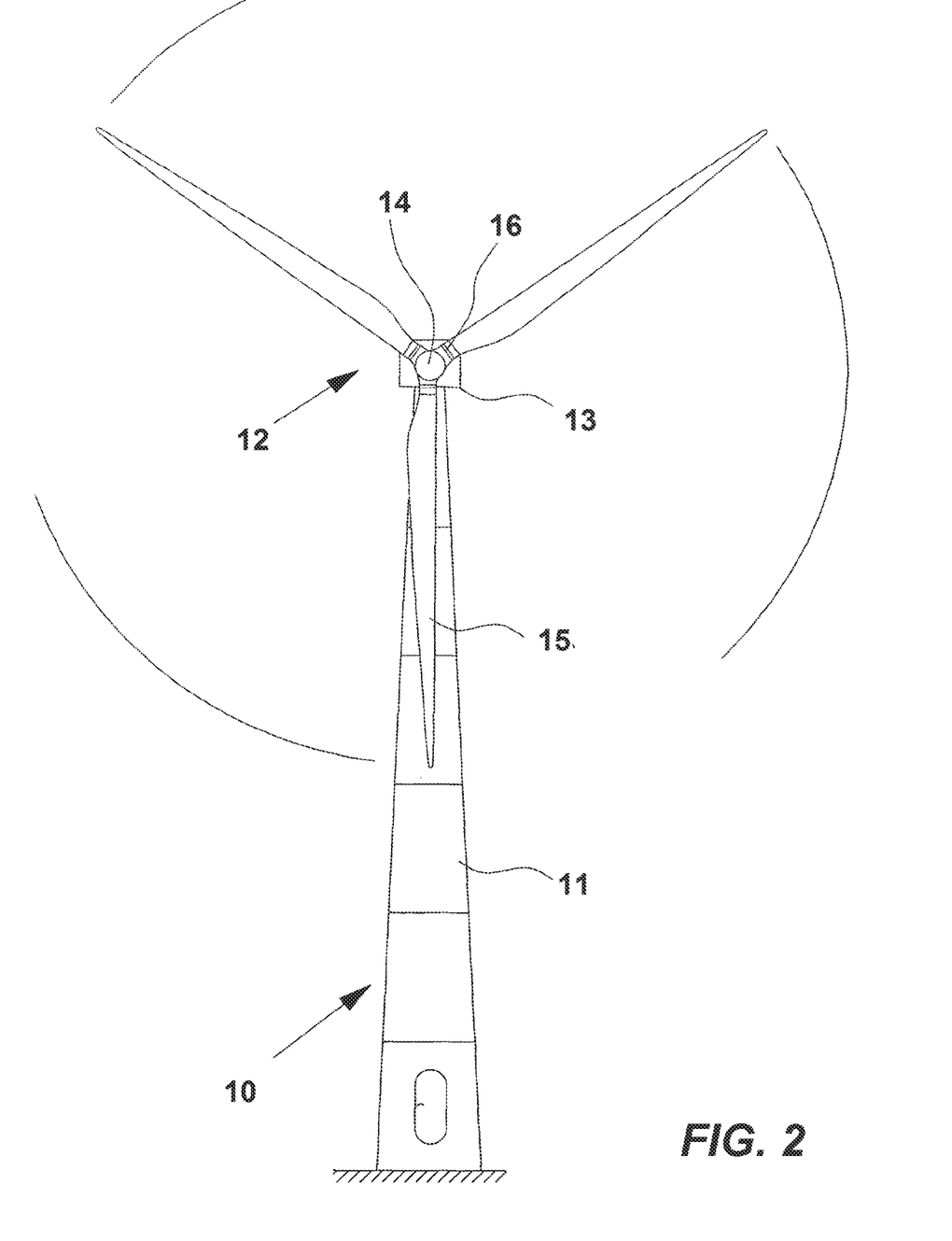
FIG. 2 is illustrates a large modern wind turbine.

FIG. 2 illustrates a large modern wind turbine (10) as known in the art, comprising a tower (11) and a wind turbine nacelle (13) positioned on top of the tower. Wind turbine blades (15) of a turbine rotor (12) are mounted on a common hub (14) which is connected to the nacelle (13) through the low speed shaft extending out of the nacelle front. The wind turbine blades (15) of the turbine rotor (12) are connected to the hub (14) through pitch bearings (16), enabling the blades to be rotated around their longitudinal axis. The pitch angle of the blades (15) can then be controlled by linear actuators, stepper motors or other means for rotating the blades. The illustrated wind turbine (10) has three turbine blades (15), but it will be appreciated that the wind turbine could have another number of blades such as one, two, four, five or more.

Figure 3:
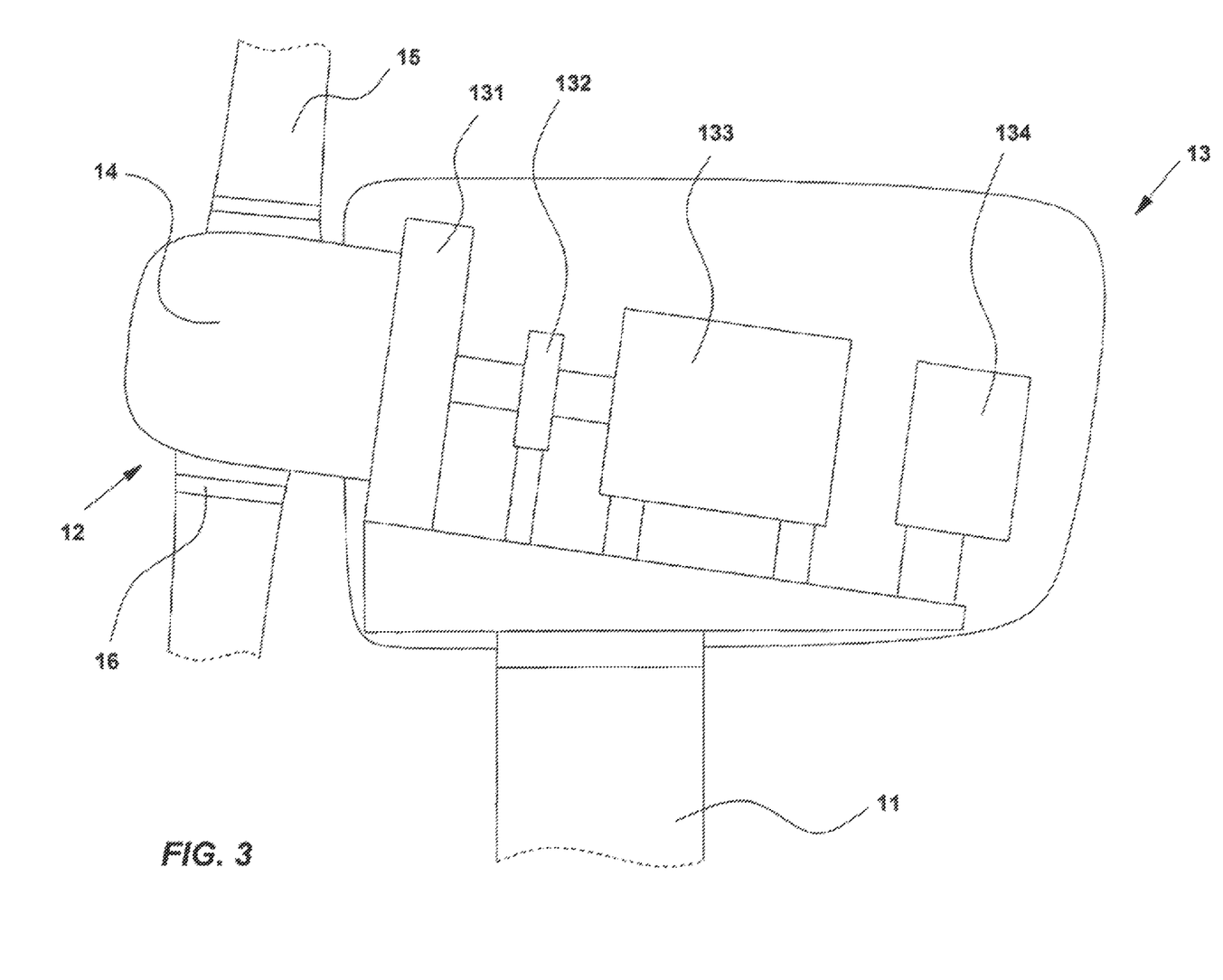
FIG. 3 illustrates a simplified cross section of a nacelle, as seen from the side.

FIG. 3 illustrates a simplified cross section of a nacelle (13) of a wind turbine (10), as seen from the side. The nacelle (13) exists in a multitude of variations and configurations but in most cases comprises one or more of following components: a gearbox (131), a coupling (not shown), some sort of braking system (132) and a generator (133). A nacelle can also include a converter (134) (also called an inverter) and additional peripheral equipment such as further power handling equipment, control cabinets, hydraulic systems, cooling systems and more.

According to embodiments of the present invention, vibration sensors are positioned at different locations about the wind turbine (10) to capture vibration data representative of the vibration levels at the respective positions. The vibration sensors are accelerometers, strain gauges or other sensors known in the art that are suitable for measuring vibration levels. There may be any number of vibration sensors, typically ten, fifteen, twenty or more.

Vibration sensors can be positioned at any location about the wind turbine (10), but are preferably located in the vicinity of components of the wind turbine that may be expected to generate or conduct vibration. For example, vibration sensors may be located on any one or more of the components of the nacelle (13) referred to above. Vibration sensors may additionally or alternatively be located in the vicinity of one or more of the main bearing housing, the main frame, the tower top or a blade root.

Vibration data from a plurality of vibration sensors are communicated from the vibration sensors for analysis. For example, the vibration data may be communicated to the same computer(s) to which the noise data is communicated.

In some embodiments, the vibration sensors are vibration sensors associated with a Condition Monitoring System (CMS) that is associated with one or more wind turbines (10). Some known wind turbines are associated with a CMS that monitors vibration levels of components of the wind turbine to predict possible component failure. Where this is the case, such vibration sensors may be used to provide vibration data for the present invention. Additionally or alternatively, one or more vibration sensors that are not associated with a CMS may be used to acquire vibration data.

Figure 4:
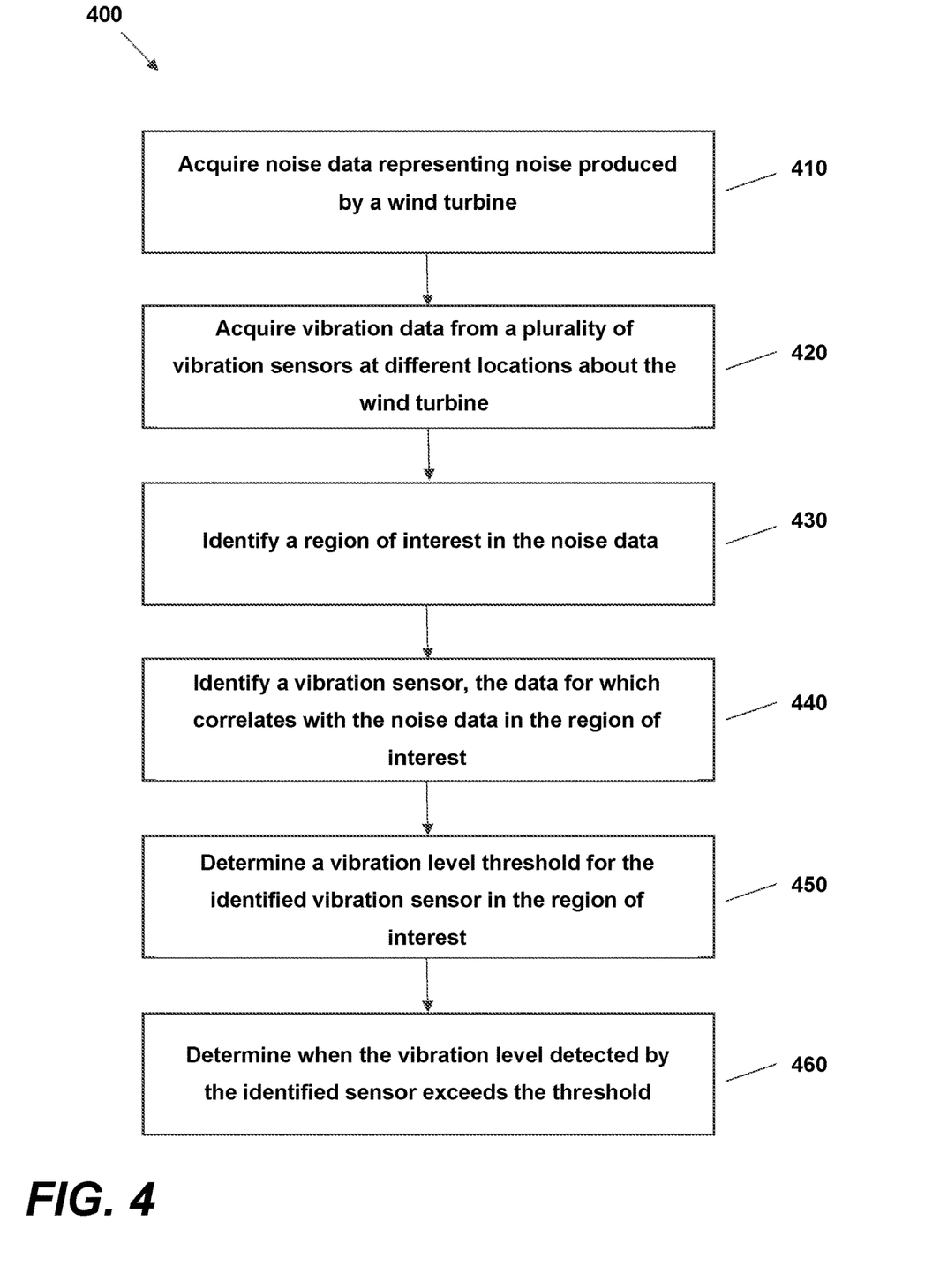
FIG. 4 is a flow chart illustrating a method of analyzing wind turbine noise.

FIG. 4 is a flow diagram illustrating a method (400) of analyzing wind turbine noise according to one aspect of the present invention. The analysis takes place in one or more computers, which may be internal or external to a wind power plant, and may be associated with one or more than one wind turbine of the wind turbines. The one or more computers may be a controller for controlling a wind turbine or wind power plant, or may be in communication with a controller for controlling a wind turbine or wind power plant.

In step 410, noise data representing noise produced by a wind turbine is acquired. The noise data is acquired via one or more microphones that are positioned to capture noise produced by one or more wind turbines of a wind power plant, as described above with respect to FIG. 1.

In step 420, vibration data from a plurality of vibration sensors positioned at different locations about the wind turbine are acquired. The vibration sensors capture vibration data representative of the vibration levels at the respective locations, as described above with respect to FIG. 3.

In step 430, a region of interest in the noise data is identified. The region of interest is a region of the noise data which is considered to be a candidate for containing tonal noise produced by the wind turbine. This will usually be a region of the noise data where there is a sharp increase in the detected noise level. For example, the region of interest may be identified by determining a variation of detected noise levels in the noise data. Exemplary methods of identifying a region of interest will be described in more detail below with respect to FIG. 6, and other methods will be apparent to those skilled in the art.

In step 440, a vibration sensor for which the vibration level data correlates with the noise data in the region of interest is identified. Identifying such a sensor involves comparing the noise data and vibration level data in the region of interest, and may involve standard data correlation techniques. In order to compare the noise data and the vibration level data, it may be necessary to first time-synchronize the noise data and vibration level data. Where there is a correlation between vibration data and noise data in the region of interest for more than one of the vibration sensors, the vibration sensor whose data has the best correlation may be chosen. Alternatively, multiple vibration sensors may be identified. For example, a correlation value representative of the strength of the correlation between the noise data and vibration level data may be calculated, and the vibration sensor with the greatest correlation value, or vibration sensors with a correlation value exceeding a predetermined value, may be identified.

In step 450, a vibration level threshold is determined for the identified vibration sensor. Where more than one vibration sensor was identified in step 440, vibration level thresholds may be determined for each of the identified vibration sensors. The vibration level threshold is based on the vibration level detected by the identified vibration sensor in the region of interest, and may be determined in any number of ways. For example, the threshold vibration level may be determined to be equal to the vibration level detected by the identified sensor when the noise data exceeded a predetermined noise level threshold. As another example, the threshold may be defined as the difference in maximum and minimum vibration levels detected by the identified vibration sensor in the region of interest.

Finally, in step 460, it is determined when the vibration level detected by the identified vibration sensor exceeds the determined vibration level threshold. Where more than one vibration sensor is identified in step 440, and more than one vibration level threshold is determined in step 450, it may be determined when any one or a combination of more than one of the determined thresholds are exceeded.

Generally, when sensors are identified that correlate well with noise data, data from said sensors may be used for various purposes. In particular, the sensor data may be considered indicative of output noise, particularly tonal noise, and this may be used in a subsequent control strategy, data recording strategy, or notification strategy, whereby the sensor data is used to control a further function within the wind turbine, or in an external system. Techniques other than identifying a threshold value may therefore be used instead, and so steps 450 and 460 are optional. As an example, the identified sensor data may be reported to another system (internal or external to the turbine or wind park control systems) for use as a substitute for noise data. Generally, action may be taken by the turbine controller, wind park controller, or another system, when the sensor data meets one or more predetermined conditions, which indicate tonal noise is occurring.

Optionally, when it is determined that the vibration level detected by the identified vibration sensor exceeds a threshold, or when otherwise triggered by the vibration sensor data meeting a predetermined condition, an event is logged. An event may also be logged in response to receiving a remote request. Such a remote request may be made by or in response to a wind turbine neighbour experiencing wind turbine noise. Logging an event can include recording the time at which the threshold was exceeded, the duration the threshold was exceeded and one or more wind turbine operating parameters such as the RPM, power output, torque, blade pitch angle, wind speed or wind direction. The vibration levels detected by one or more of the vibration sensors may also be recorded.

Logging events is advantageous as the recorded data can be compared to additional data indicative of noise levels generated by the wind turbine from alternative sources. For example, if a wind turbine neighbour submits a complaint about wind turbine noise at a particular time, it can be determined whether this time coincides with a logged event. Where it does coincide with a logged event, one or more wind turbine operating parameters at the time of the event are known and can be used to determine future wind turbine operation. If the time of the noise complaint does not coincide with a logged event, this can be used to determine whether threshold vibration levels need to be adjusted.

The one or more computers may be configured to send a notification to a remote user when the vibration level detected by the identified vibration sensor exceeds the determined threshold. The notification can include logged parameters such as the time the threshold was exceeded, the duration it was exceeded for, and/or one or more wind turbine operating parameters.

Figure 5:
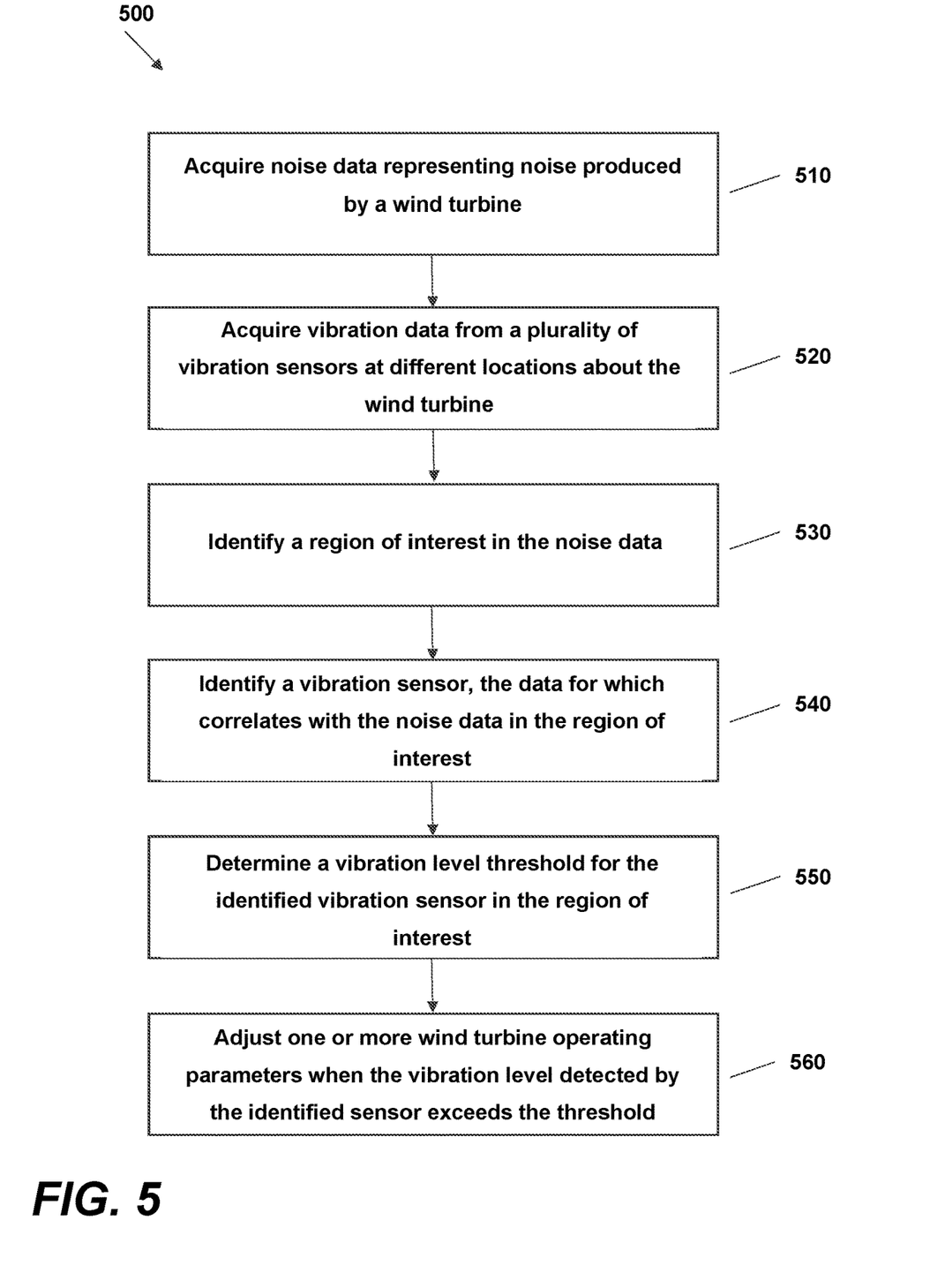
FIG. 5 is a flow chart illustrating a method of controlling a wind turbine to avoid tonal noise production.

FIG. 5 is a flow diagram illustrating a method (500) of controlling a wind turbine to avoid tonal noise production according to another aspect of the present invention. The wind turbine is controlled by a wind turbine controller that is associated with one or more than one wind turbine of a wind power plant. Steps of the method may take place in the controller, or may be split between the controller and one or more computers that are in communication with the controller.

In step 510, noise data representing noise produced by a wind turbine is acquired, as explained above with respect to FIG. 1 and step 410 of method 400.

In step 520, vibration data from a plurality of vibration sensors positioned at different locations about the wind turbine are acquired, as described above with respect to FIG. 3 and step 420 of method 400.

In step 530, a region of interest in the noise data is identified. The region of interest can be identified in the same way as is described above with respect to step 430 of method 400, and as explained in more detail below with reference to FIG. 6.

In step 540, a vibration sensor for which the vibration level data correlates with the noise data in the region of interest is identified. The vibration sensor can be identified in the same way as described above with respect to step 440 of method 400.

In step 550, a vibration level threshold is determined for the identified vibration sensor. The vibration level threshold can be determined in the same way as described above with respect to step 450 of method 400.

Finally, in step 560, one or more wind turbine operating parameters are adjusted in response to the vibration level detected by the identified vibration sensor exceeding the determined vibration level threshold. Where more than one vibration sensors are identified in step 540, and more than one vibration level threshold is determined in step 550, one or more wind turbine operating parameters may be adjusted in response to any one or combination of one or more of the vibration levels detected in the respective identified vibration sensors exceeding the respective determined vibration level thresholds.

The one or more wind turbine operating parameters that are adjusted may be one or more of the RPM of the wind turbine, the power output of the wind turbine, the torque produced, and the blade pitch angle of the blades of the wind turbine.

The wind turbine operating parameters are adjusted to reduce or avoid tonal noise production by the wind turbine. The adjustment may further take into account a predetermined operational envelope that satisfies one or more predetermined operational constraints. In particular, an operational envelope may be defined separately to the embodiments described herein, taking into account one or more constraints such as aero-noise constraints, wear constraints, load constraints and power output constraints. Such constraints may depend, for example, on time of day (additional aero-noise constraints may exist during the night) and wind speed. The one or more operating parameters may be adjusted to reduce or avoid tonal noise production while also remaining within the operational envelope, and may also be adjusted so as to maximise energy production while remaining within the operational envelope.

Referring now to both methods 400 and 500, optionally, the methods (400, 500) further comprise acquiring wind turbine operating parameter data representing operating parameters of the wind turbine, such as the RPM, power output, torque, blade pitch angle, wind direction and wind speed. Such parameters are measured by appropriate sensors, as described above with respect to FIG. 1.

Where wind turbine operating parameter data is acquired, the methods (400, 500) may further comprise determining a set of one or more operating parameters from the operating parameter data for the region of interest. The method may also involve determining a set of operating parameter ranges corresponding to the region of interest in the noise data. For example, for a given region of interest, the extremes of an operating parameter range may correspond to the smallest and largest values of that operating parameter in the region of interest.

Where a set of operating parameter ranges are determined, steps 460 and 560 of methods 400 and 500 may be modified so that it is determined when, or adjustments to one or more wind turbine operating parameters are made when, the vibration level detected by the identified vibration sensor exceeds the determined threshold and at the same time one or more wind turbine operating parameters are detected to be within the determined set of operating parameters ranges. Similarly, events may only be logged when both the vibration level detected by the identified sensor exceeds the determined threshold and the one or more wind turbine operating parameters are detected to be within the determined set of operating parameters ranges.

Optionally, the methods (400, 500) further comprise determining a relationship between noise level, vibration level for the identified vibration sensor and, where relevant data has been acquired, one or more wind turbine operating parameters. The determined relationship may be used to predict a set of wind turbine operating parameters for which tonal noise is likely to be generated by the wind turbine.

In some embodiments, the noise data and the wind turbine operating parameter data are combined to produce data representing noise produced by the wind turbine as a function of one or more wind turbine operating parameters. This may require time-synchronizing the noise data and wind turbine operating parameter data. The region of interest in the noise data may then be identified from the combined data, in which case an operating parameter range(s) may be determined as the range(s) of operating parameters used to define the region of interest. For example, in some embodiments, the noise data is combined with RPM data to give data representing the noise produced by the wind turbine as a function of, or in relation to, the RPM of the wind turbine. The region of interest may then be determined from this data, in which case the region of interest in the noise data would correspond to a range of RPM values.

Figure 6:
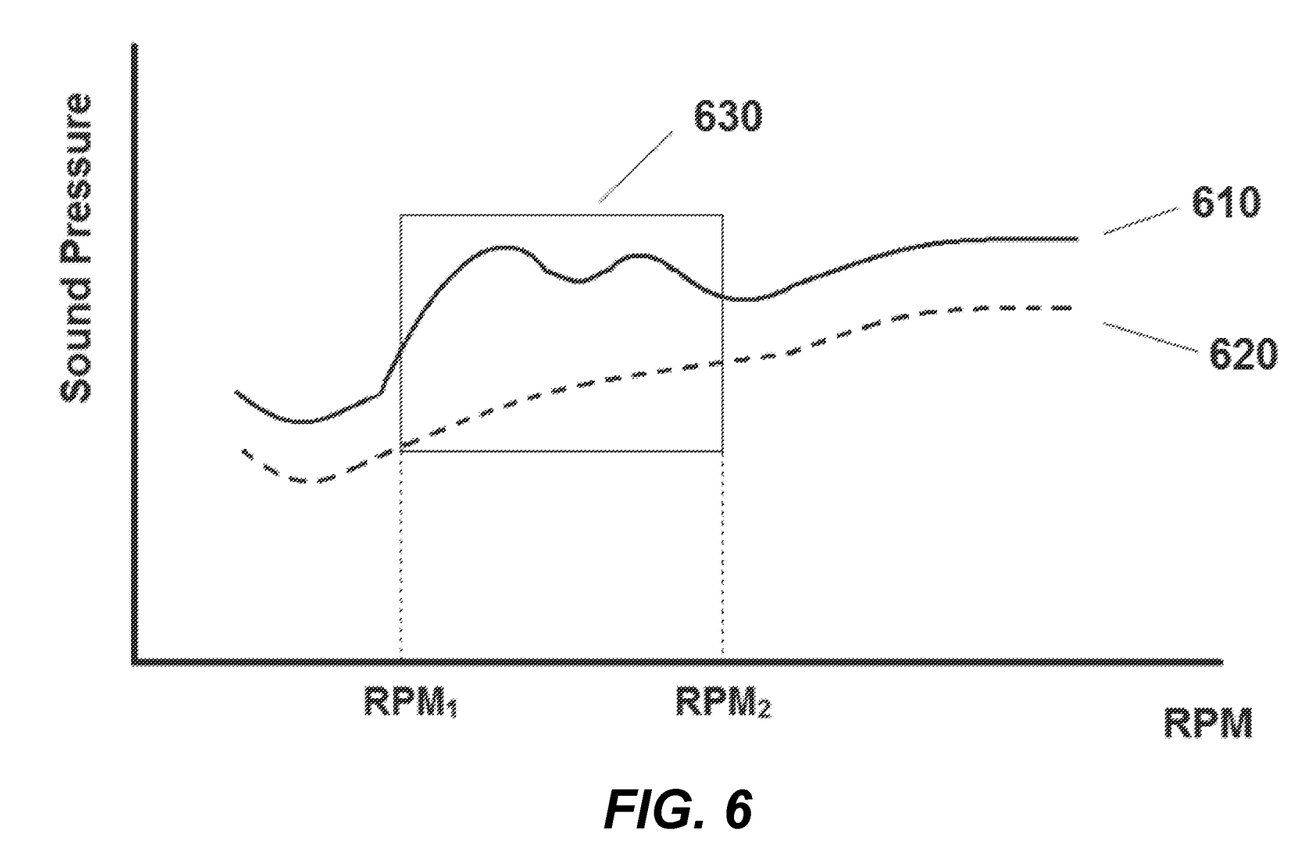
FIG. 6 illustrates exemplary noise data and a method of identifying a region of interest in the noise data.

FIG. 6 shows exemplary noise data and illustrates a method of identifying a region of interest in noise data in accordance with embodiments of the present invention.

As can be seen from FIG. 6, the measured sound pressure, which represents noise, is plotted on the vertical axis and the RPM of the turbine is plotted on the horizontal axis. Two curves are shown: a solid curve (610) representing the maximum measured sound pressure as a function of RPM, and a dashed curve (620) representing the minimum measured sound pressure a function of RPM. Such a dataset can be created by combining various time-synchronized sound pressure and RPM data obtained over different periods of time, as will be appreciated by persons skilled in the art.

In general, the deviation between the maximum measured sound pressure (510) and the minimum measured sound pressure (620) is relatively small. However, within an area indicated by the box (630), between RPM values $RPM_1$ and $RPM_2$, there is a greater deviation between the maximum and minimum measured sound pressures. Such a deviation may indicate that the wind turbine was producing tonal noise when the RPM of the wind turbine was between $RPM_1$ and $RPM_2$. The RPM range between $RPM_1$ and $RPM_2$ may then be identified as a region of interest in the noise data.

Determining the values of $RPM_1$ and $RPM_2$ may involve determining RPM values at which the deviation between the maximum and minimum measured noise (sound pressure) exceeds a predetermined threshold. Alternatively, $RPM_1$ and $RPM_2$ may be RPM values between which the average variation between the maximum and minimum measured noise exceeds predetermined threshold. As another example, noise data may be analyzed to determine RPM intervals in the data in which tonality is most pronounced, for example in accordance with the IEC 61400-11 standard. Other ways of determining values will be apparent to one skilled in the art.

While the method of identifying the region of interest in the noise data has been described with respect to RPM data, other wind turbine operating parameters could be used. For example, a dataset representing noise level as a function of blade pitch angle, wind speed, torque or any other operating parameter could be used.

Alternatively, as explained above with reference to FIGS. 4 and 5, the region of interest in the noise data could be identified without using any wind turbine operating parameter data.

For example, a sharp increase in the noise data, or just a very high noise level at a particular frequency, may indicate that the wind turbine began to emit to tonal noise at the time corresponding to the sharp increase or the very high noise level.

Figure 7:
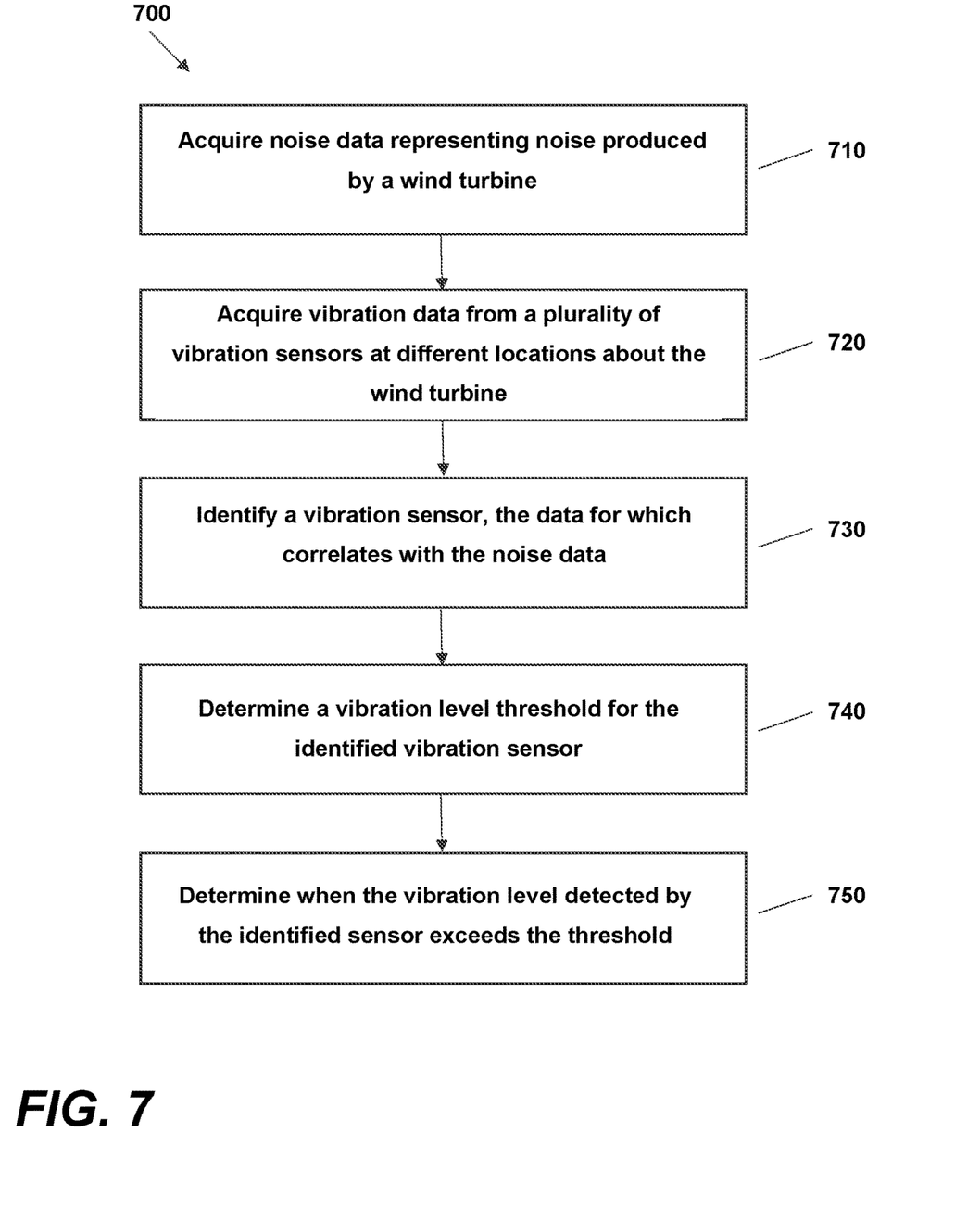
FIG. 7 is a flow chart illustrating a method of analyzing wind turbine noise.

FIG. 7 is a flow diagram illustrating a method (700) of analyzing wind turbine noise according to one aspect of the present invention. Like method 400, the analysis takes place in one or more computers, which may be internal or external to a wind power plant, and may be associated with one or more than one wind turbine of the wind turbines. The one or more computers may be a controller for controlling a wind turbine or wind power plant, or may be in communication with a controller for controlling a wind turbine or wind power plant.

Steps 710 and 720 correspond to steps 410 and 420 of method 400, where noise data representing noise produced by a wind turbine and vibration data from a plurality of vibration sensors positioned at different locations about the wind turbine are acquired.

In step 730, which may be performed in addition to steps 430 and 440, a second vibration sensor for which the vibration level data generally correlates with the noise data is identified. That is, rather than identifying one or more sensors the data for which correlate specifically in a region of interest of the noise data, one or more sensors the data for which correlate over a broad range are identified. Where step 730 is performed in addition to steps 430 and 440 of method 400, step 730 may involve identifying one or more second vibration sensors for which the vibration level data correlate with the noise data outside of the region identified in step 420. Data from the identified second vibration sensor may be used to determine levels of noise emitted by a wind turbine.

In step 740, which may be performed in addition to step 450, a vibration level threshold is determined for each of the identified second vibration sensors. The vibration level threshold is based on the vibration level detected by the respective identified second vibration sensor, and may be determined in any number of ways. For example, the threshold vibration level for the identified second vibration sensor may be determined to be equal to the vibration level detected by the identified sensor when the noise data exceeded a predetermined noise level threshold. As another example, the threshold may be equal to the maximum or minimum vibration level detected by the identified vibration sensor.

Finally, in step 750, which may be performed in addition to step 460, it is determined when the vibration level detected by the identified second vibration sensor exceeds the vibration level threshold determined for the second vibration sensor.

Again, generally when second sensors are identified that correlate well with noise data, data from said sensors may be used for various purposes. In particular, the sensor data may be considered indicative of output noise, particularly tonal noise, and this may be used in a subsequent control strategy, data recording strategy, or notification strategy, whereby the sensor data is used to control a further function within the wind turbine, or in an external system. Techniques other than identifying a threshold value may therefore be used instead, and so steps 740 and 750 are optional. As an example, the identified sensor data may be reported to another system (internal or external to the turbine or wind park control systems) for use as a substitute for noise data. Generally, action may be taken by the turbine controller, wind park controller, or another system, when the sensor data meets one or more predetermined conditions, which indicate the level of noise occurring. The second sensor data may be used in conjunction with the first sensor data.

It will be appreciated that the optional steps described above with respect to methods 400 and 500, such as the determination of wind turbine operational parameter ranges, the logging of events, and the determination of relationships between noise level, vibration level of the identified sensor and operating parameters, may also be applied to the steps of method 700.

Figure 8:
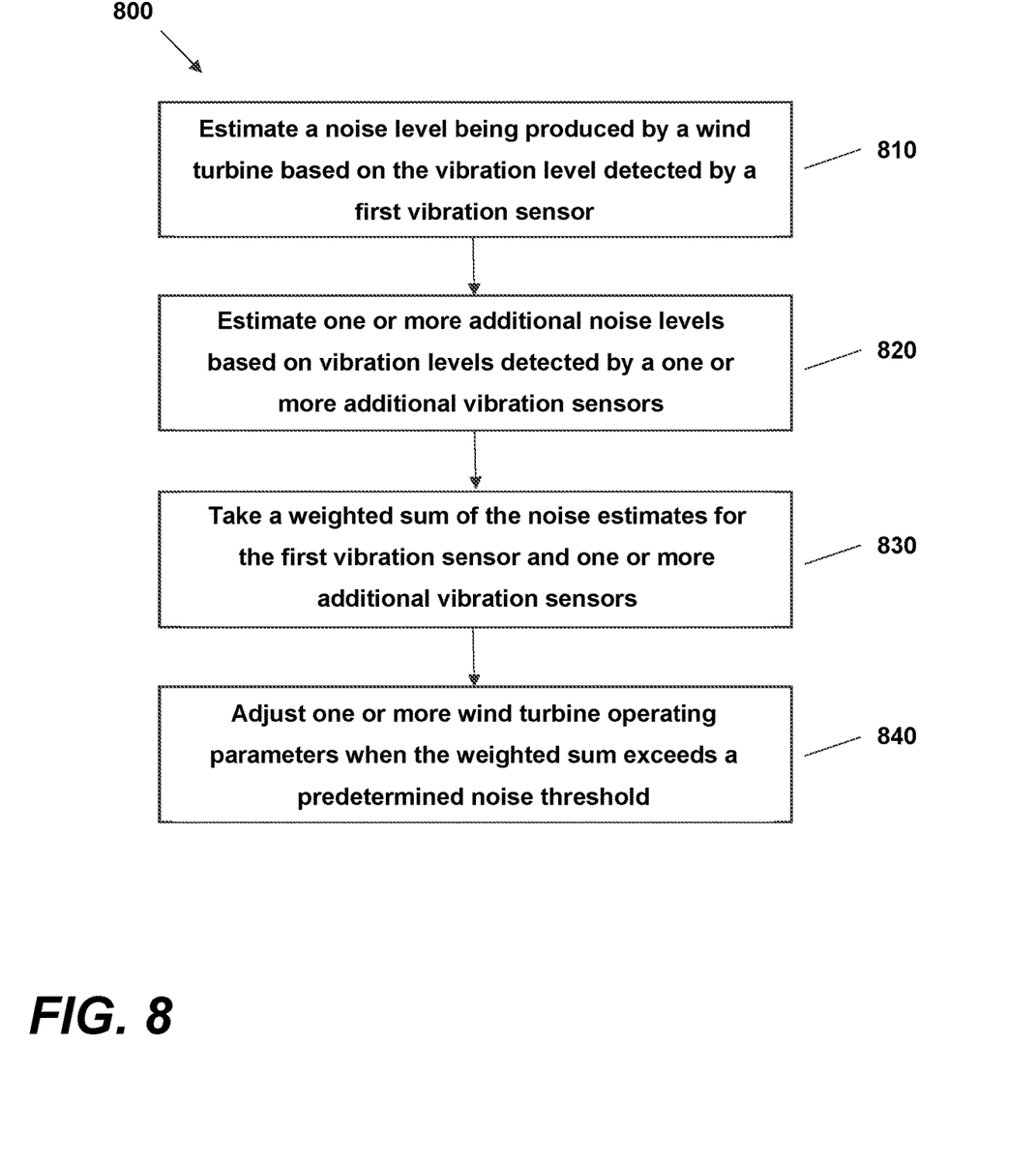
FIG. 8 is a flow chart illustrating a method of controlling a wind turbine to avoid tonal noise production.

FIG. 8 is a flow diagram illustrating a method (800) of controlling a wind turbine to avoid tonal noise production according to an aspect of the invention. As with the previous methods, the wind turbine may be controlled by a wind turbine controller that is associated with one or more than one wind turbines of a wind power plant, and the wind turbine can be any wind turbine as described previously. Steps of the method may take place in the controller, or may be split between the controller and one or more computers that are in communication with the controller.

In step 810, an estimate of a noise level being produced by a wind turbine is made based on a vibration level detected by a first vibration sensor positioned at a first location about the wind turbine. The first vibration sensor can be the vibration sensor identified in step 440 or 540 of methods 400 and 500, and the estimate of the noise level produced by the wind turbine may be made in response to the vibration level detected by the identified vibration sensor exceeding the threshold determined in steps 450 and 500 of methods 400 and 500. The estimate may be made using a determined relationship between noise level, vibration level in the identified vibration sensor, and optionally one or more wind turbine operating parameters. In some cases, step 810 may further involve converting the noise estimate based on the detected vibration level into an estimate of tonal audibility in accordance with the methods described in section 9.5 of the third edition of IEC standard 61400-11. In optional step 820, noise estimates are made for one or more additional vibration sensors positioned at different locations about the wind turbine, based on the vibration levels detected by the respective vibration sensors. The one or more additional vibration sensors may be additional vibration sensors identified in steps 440 and 540, and/or may be vibration sensors identified in step 730 of method 700. The estimates may be made based on determined relationships for the one or more additional vibration sensors.

In optional step 830, a weighted sum of the noise estimates made in steps 810 and 820 is taken. In some embodiments, the respective weightings used in the weighted sum are all equal to one. In other embodiments, the respective weightings are based on the strength of a correlation between the noise data and vibration data for the respective vibration sensor, particularly in the region of interest of methods 400 and 500. Taking a weighted sum of noise estimates corresponding to multiple vibration sensors can produce an improved noise estimate that better accounts for and includes secondary and tertiary noise sources, and which better describes the shapes of the modes responsible for the tonality.

In step 840, one or more wind turbine operating parameters are adjusted if the weighted sum of the noise estimates exceeds a predetermined threshold. Where optional steps 820 and 830 are not performed, one or more wind turbine operating parameters are adjusted if the noise estimate for the first vibration sensor of the noise estimates exceeds a predetermined threshold. Step 840 may be performed in addition to or alternatively to step 560 of method 500.

Generally the turbine noise data used to correlate vibration sensor data to noise has been described above as being detected using one or more microphones. However, for the avoidance of doubt, noise data can be obtained from other sources, and so a microphone is not a requirement. For example, the noise data can be calculated using one or more noise emission models for wind turbines, a number of which are well known in the art. The models may take one or more turbine or wind farm parameters as inputs and provide, as an output, noise data indicating the volume and frequencies of emitted noise at various distances from the wind turbine.

Described above are a number of embodiments with various optional features. It should be appreciated that, with the exception of any mutually exclusive features, and combination of one or more optional features are possible.

The invention claimed is:

1. A method of analyzing wind turbine noise, the method comprising:
   acquiring noise data representing noise produced by a wind turbine;
   acquiring vibration data from a plurality of vibration sensors coupled to a plurality of components of the wind turbine;
   identifying a region of interest in the noise data, the region of interest being a candidate for containing tonal noise generated by the wind turbine; and
   identifying a vibration sensor from the plurality of vibration sensors, the vibration data for which correlates with the noise data in the region of interest, which indicates that a vibration in a component of the plurality of components coupled to the identified vibration sensor caused the noise represented by the noise data in the region of interest.

2. The method according to claim 1, further comprising using data from the identified vibration sensor to determine tonal noise emitted by a wind turbine.

3. The method according to claim 1, further comprising:
   determining a threshold vibration level for the identified vibration sensor, the threshold vibration level being based on a vibration level detected by the identified vibration sensor in the region of interest; and
   determining when a vibration level detected by the identified vibration sensor exceeds the threshold vibration level.

4. The method according to claim 1 wherein the region of interest is identified by determining a variation of detected noise levels in the noise data indicative of tonal noise.

5. The method according to claim 4 wherein the region of interest is identified by comparing a maximum noise level and a minimum noise level present in the noise data associated with one or more wind turbine parameters.

6. The method according to claim 5 wherein the one or more wind turbine parameters are one or more of rotations per minute (RPM), torque, wind speed and blade pitch angle.

7. The method according to claim 1, further comprising determining, for the region of interest, a relationship between noise level and vibration level for the identified vibration sensor.

8. The method according to claim 1, further comprising:
   acquiring wind turbine operating parameter data representing operating parameters of the wind turbine; and
   determining a set of wind turbine operating parameters corresponding to the region of interest.

9. The method according to claim 8 further comprising determining, for the region of interest, a relationship between noise level, vibration level for the identified vibration sensor and the wind turbine operating parameters.

10. The method according to claim 9 further comprising using the determined relationship to predict a set of a wind turbine operating parameters for which tonal noise is likely to be generated by the wind turbine.

11. The method according to claim 8, further comprising:
    determining ranges for a set of wind turbine operating parameters based on the determined set of wind turbine operating parameters for the region of interest; and
    determining when a vibration level level detected by the identified vibration sensor meets a predetermined criteria and the set of wind turbine operating parameters are within the determined ranges.

12. The method according to claim 1, further comprising logging an event when a vibration level detected by the identified vibration sensor meets a predetermined criteria.

13. The method according to claim 1, further comprising logging an event in response to receiving a remote request.

14. The method according to claim 12, further comprising logging a subsequent event when it is determined that the vibration level detected by the identified vibration sensor exceeds a determined threshold and the wind turbine operating parameters are within a determined set of ranges.

15. The method according to claim 12 wherein logging an event comprises logging a time of the event, a duration of the event, and logging wind turbine operating parameters at the time of the event.

16. The method according to claim 12, further comprising comparing a logged event to additional data indicative of noise levels generated by the wind turbine obtained from alternative sources.

17. The method according to claim 1, further comprising time-synchronizing acquired noise data with acquired vibration data.

18. The method according to claim 17, further comprising time-synchronizing acquired noise data with one or more wind turbine operating parameters.

19. The method according to claim 8, or any claim dependent thereon, wherein the wind turbine operating parameters include at least one of an RPM, power output, torque, wind speed, wind direction and blade pitch angle.

20. The method according to claim 19, wherein the region of interest corresponds to an RPM range.

21. The method according to claim 1, wherein the vibration sensors are accelerometers and/or strain gauges.

22. The method according to claim 1, wherein the vibration sensors are associated with a Condition Monitoring System (CMS) associated with the wind turbine.

23. The method according to claim 1, wherein the plurality of components comprises one or more of a gearbox, a generator, a main bearing housing, a main frame, a tower top, or a turbine blade root.

24. The method according to claim 1 further comprising identifying a second vibration sensor, data for which correlates with the noise data outside the region of interest.

25. The method according to claim 24, further comprising using data from the identified second vibration sensor to determine noise emitted by a wind turbine.

26. The method according to claim 24, further comprising:
    determining a threshold vibration level for the second vibration sensor, the threshold vibration level being based on a vibration level detected by the second vibration sensor; and determining when the vibration level detected by the second vibration sensor exceeds the threshold vibration level.

27. The method according to claim 24 further comprising determining a relationship between noise level and vibration level for the second vibration sensor.

28. The method according to claim 24 further comprising acquiring wind turbine operating parameter data representing a set of operating parameters of the wind turbine.

29. The method according to claim 28 further comprising determining a relationship between noise level, vibration level for the second vibration sensor and wind turbine operating parameters.

30. A controller, comprising:
   an interface adapted for communicative coupling with a plurality of vibration sensors coupled to a plurality of components of a wind turbine and with a source of noise data representing noise produced by the wind turbine;
   a processor configured by code to perform an operation, comprising:
      identifying a region of interest in the noise data, the region of interest being a candidate for containing tonal noise generated by the wind turbine; and
      identifying a vibration sensor from the plurality of vibration sensors, vibration data for which correlates with the noise data in the region of interest, which indicates that a vibration in a component of the plurality of components coupled to the identified vibration sensor caused the noise represented by the noise data in the region of interest.

31. The controller according to claim 30, the operation further comprising sending a notification to a remote user when a vibration level detected by the identified vibration sensor indicates that tonal noise is emitted.

32. The controller according to claim 30, the operation further comprising sending a notification to a remote user when a vibration level detected by the identified vibration sensor exceeds a determined threshold.

33. A program product comprising a computer readable medium containing code which, when executed by one or more processors, performs an operation comprising:
   acquiring noise data representing noise produced by a wind turbine;
   acquiring vibration data from a plurality of vibration sensors coupled to a plurality of components of the wind turbine;
   identifying a region of interest in the noise data, the region of interest being a candidate for containing tonal noise generated by the wind turbine; and
   identifying a vibration sensor from the plurality of vibration sensors, the vibration data for which correlates with the noise data in the region of interest, which indicates that a vibration in a component of the plurality of components coupled to the identified vibration sensor caused the noise represented by the noise data in the region of interest.

\* \* \* \* \*